(12) United States Patent
Gallot et al.

(10) Patent No.: US 12,436,173 B2
(45) Date of Patent: Oct. 7, 2025

(54) CURRENT SENSOR SYSTEM

(71) Applicant: Melexis Technologies SA, Bevaix (CH)

(72) Inventors: Mathieu Gallot, Bevaix (CH); Robert Racz, Bevaix (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 155 days.

(21) Appl. No.: 18/186,520

(22) Filed: Mar. 20, 2023

(65) Prior Publication Data
US 2023/0305040 A1  Sep. 28, 2023

(30) Foreign Application Priority Data

Mar. 23, 2022 (EP) .................................... 22163920

(51) Int. Cl.
*G01R 15/20* (2006.01)
*G01R 19/00* (2006.01)

(52) U.S. Cl.
CPC ......... *G01R 15/202* (2013.01); *G01R 15/207* (2013.01); *G01R 19/0092* (2013.01)

(58) Field of Classification Search
CPC .............. G01R 19/0092; G01R 15/202; G01R 15/205; G01R 33/07; G01R 33/09; G01R 33/0047; G01R 33/0011; G01R 15/148; G01R 33/093; G01R 19/0007; G01R 35/005; G01R 33/091; G01R 15/142; G01R 19/00; G01R 33/02; G01R 33/072; G01R 33/12; G01R 15/146; G01R 15/207; G01D 5/485; G01D 5/145; G01D 2205/40

See application file for complete search history.

(56) References Cited

U.S. PATENT DOCUMENTS

| | | | |
|---|---|---|---|
| 8,680,856 B2 * | 3/2014 | Schmitt ................ | G01R 33/022 324/252 |
| 9,024,628 B2 * | 5/2015 | Nakamura ............... | B62D 6/10 324/202 |
| 10,948,522 B2 * | 3/2021 | Shimizu ................. | G01R 33/07 |
| 11,204,372 B2 * | 12/2021 | Miyamoto ........... | G01R 15/205 |

(Continued)

FOREIGN PATENT DOCUMENTS

| | | |
|---|---|---|
| WO | 2021023874 A1 | 2/2021 |
| WO | WO2021023874 * | 2/2021 |

OTHER PUBLICATIONS

Extended European Search Report from corresponding European Application No. 22163920.6, Aug. 23, 2022.

*Primary Examiner* — Vinh P Nguyen
(74) *Attorney, Agent, or Firm* — Workman Nydegger

(57) ABSTRACT

A current sensor system for measuring an AC electrical current, includes: an electrical conductor portion for conducting the AC current and generating a first magnetic field; a U-shaped magnetic shielding partially surrounding said electrical conductor portion, and having a central shielding portion and two shielding leg portions; a metal plate or a metal layer arranged at a distance from the shielding legs portions for allowing eddy currents to flow and for generating a second magnetic field; a magnetic sensor device arranged between the conductor portion and the metal plate or metal layer, and between the shielding leg portions, configured for measuring a magnetic field component. The sensor system likewise includes a three-phase current sensor system.

15 Claims, 11 Drawing Sheets

(56) References Cited

U.S. PATENT DOCUMENTS

| | | | |
|---|---|---|---|
| 11,493,537 B2 * | 11/2022 | Glenske | G01R 33/022 |
| 11,561,200 B1 * | 1/2023 | Nechitailo | G01N 27/9006 |
| 2017/0370969 A1 | 12/2017 | Okuyama et al. | |
| 2019/0187183 A1 | 6/2019 | Okuyama et al. | |
| 2022/0268812 A1 | 8/2022 | Glenske et al. | |

\* cited by examiner

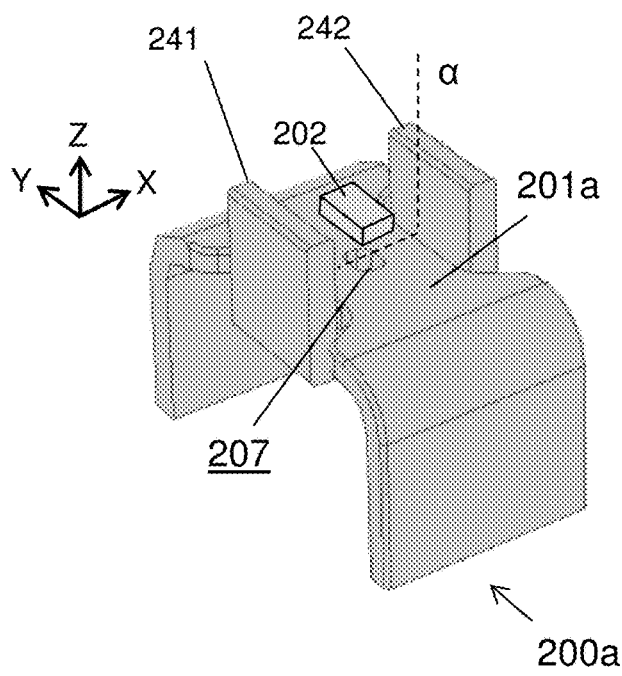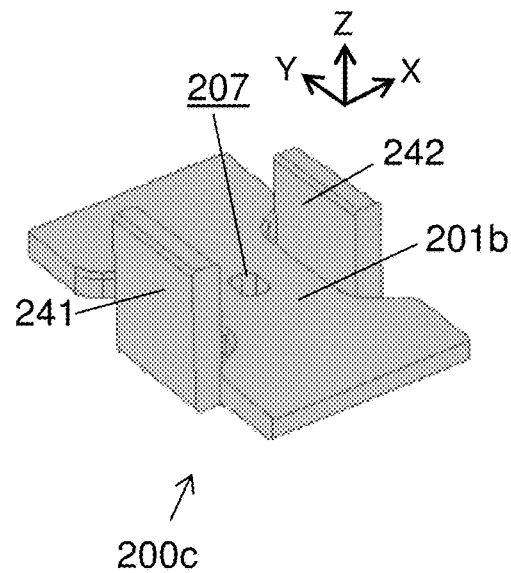
FIG 2(a)  FIG 2(b)
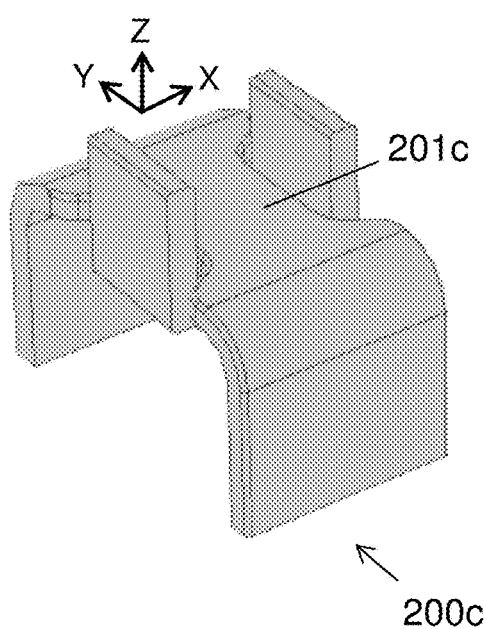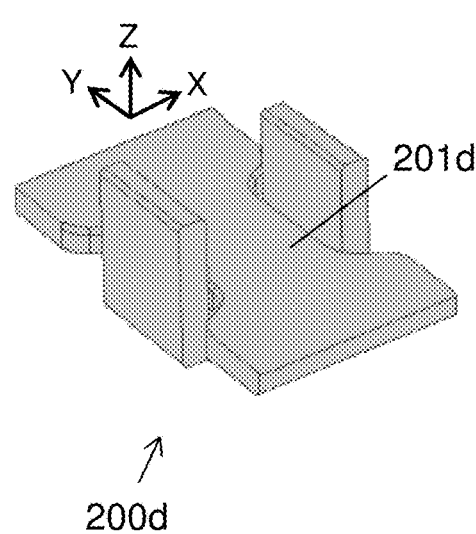
FIG 2(c)  FIG 2(d)

CURRENT SENSOR SYSTEM

FIELD OF THE INVENTION

The present invention relates in general to the field of magnetic current sensor systems, and more in particular to current sensor systems capable of accurate measurement of an AC current having frequencies up to about 1500 Hz or up to about 2 kHz.

BACKGROUND OF THE INVENTION

Different kinds of current sensors are known in the art, for example (1) current sensors using a shunt resistor, (2) using a current transformer, (3) or using a magnetic sensor.

In current sensors using a shunt resistor, a voltage is measured over the shunt resistor, and the current value can be determined by dividing the measured voltage value and the resistor value. A disadvantage of this type is that the measurement circuit is not electrically isolated from the load. A current transformer includes primary and secondary coils. While this type of current sensor provides galvanic separation, it is usually very bulky. Current sensors based on magnetic sensors provide both galvanic separation and can be very compact.

Known current sensors are typically designed to measure DC currents or low frequency currents, for example currents having a frequency of about 50 Hz or about 60 Hz.

Various electrical motor types exist, for example: so called DC brushed motors, DC brushless motors, AC brushless motors, linear motors, stepper motors, etc. In electrical vehicles, the following motor types are typically used: DC Series Motor, Brushless DC Motor, Permanent Magnet Synchronous Motor (PMSM), Three Phase AC Induction Motors, Switched Reluctance Motors (SRM).

Various electrical circuits for driving and/or controlling and/or monitoring electrical motors exist. In some of these circuits the actual currents provided to the motor need to be measured. These currents may have a magnitude of several tens or even hundreds of Amperes and may have a frequency or frequency components up to several kHz. These currents are typically provided to the motor via so called "busbars". Busbars often come in the form of a metallic strip or bar, for example a copper bar.

It is known that, when AC currents flow through an electrical conductor, a phenomenon known as "skin effect" will occur. This causes the effective electrical resistance of the electrical conductor to increase. The higher the frequency of the electrical current, the higher the effective resistance of the electrical conductor.

It is a challenge to measure an AC current with high accuracy.

SUMMARY OF THE INVENTION

It is an object of embodiments of the present invention to provide a current sensor system for measuring an AC current, for example an AC current flowing through a busbar.

It is an object of embodiments of the present invention to provide a current sensor system for measuring an AC current with improved accuracy, and/or which is less sensitive to mounting tolerances, and/or which is less sensitive to temperature variations, and preferably two of these, or all of these.

It is an object of embodiments of the present invention to provide a current sensor system for measuring an AC current having frequencies up to about 1500 Hz or up to about 2000 Hz with improved accuracy.

It is an object of embodiments of the present invention to provide a current sensor system for measuring the instantaneous or momentary amplitude of an AC current having frequencies up to about 1500 Hz or up to about 2000 Hz with improved accuracy.

It is an object of embodiments of the present invention to provide a current sensor system for measuring an AC current with improved accuracy in a simple manner, e.g. without having to perform spectral analysis (e.g. Fourier analysis), and/or without having to analyse the current waveform in the time domain (e.g. sinusoidal, square, triangular).

It is an object of embodiments of the present invention to provide a current sensor system for measuring an AC current having an amplitude of up to 500 Amps or up to 750 Amps or up to 1000 Amps or up to 1250 Amps or up to 1500 Amps, and having frequencies up to about 1500 Hz or up to about 2000 Hz, which is more accurate, and which is preferably also less sensitive to mounting tolerances and/or to temperature variations, and preferably both.

It is an object of embodiments of the present invention to provide a current sensor system capable of measuring an AC current with an absolute accuracy within ±3% (or better) for AC currents having amplitudes up to 750 Amps (or more, e.g. up to 1500 A), and having frequencies up to 1500 Hz (or more, e.g. up to 2000 Hz), in an ambient temperature in the range from 25° C. to 105° C. (or a larger range, e.g. from −20° C. to +125° C., or from −40° C. to +160° C.), and for mounting tolerances of a magnetic sensor device up to ±0.3 mm (or up to ±0.5 mm, or up to ±1 mm).

It is also an object of embodiments of the present invention to provide a three-phase current sensor system comprising three busbars for measuring three AC currents, each having an amplitude of up to 500 Amps or up to 750 Amps or up to 1000 Amps or up to 1500 Amps, and frequencies up to about 1500 Hz or up to about 2000 Hz, with an improved accuracy, and/or which is less sensitive to mounting tolerances, and/or which is less sensitive to temperature variations.

These and other objects are accomplished by a current sensor according to embodiments of the present invention.

According to a first aspect, the present invention provides a current sensor system for measuring an AC electrical current having frequencies in a predefined frequency range, the current sensor system comprising: an electrical conductor portion extending in a first direction (e.g. Y) and configured for conducting said AC electrical current, thereby creating a first magnetic field; a U-shaped magnetic shielding partially surrounding said electrical conductor portion, and having a central shielding portion extending in a second direction (e.g. X) perpendicular to the first direction (e.g. Y), and having two shielding leg portions extending in a third direction (e.g. Z) perpendicular to the first and second direction; a metal plate or metal layer arranged at a predefined distance (e.g. g) from the shielding legs portions for allowing eddy currents to flow in said metal plate or metal layer, thereby creating a second magnetic field which is superimposed with the first magnetic field; a magnetic sensor device arranged between the conductor portion and the metal plate or metal layer, and arranged between the two shielding leg portions, and configured for measuring a magnetic field component (e.g. Bx) oriented in the second direction (e.g. X); wherein the metal plate or metal layer has a length (e.g. Lp) larger than a length (e.g. Lsh) of the shielding measured in the first direction (e.g. Y), and a width (e.g. Wp) larger than 90% of a distance (e.g. Wsi) between inner sides of the shielding legs, and a thickness (e.g. Tp); or wherein the metal plate or metal layer is a portion of a metal housing with a cavity in the vicinity of the magnetic sensor, the metal plate or metal layer having a residual thickness (e.g. Tres).

The inventors discovered that the AC current can be measured with improved accuracy by addition of an electrically conductive surface, e.g. a metal plate made from Al or Cu. They surprisingly found that the magnetic field induced by the eddy currents can reduce the error, thus improve the accuracy of the current measurement, if located at a suitable distance from the shield, and if having a suitable plate thickness. This is totally unexpected, and highly counter-intuitive because it is well known and commonly accepted/believed that eddy currents negatively influence measurements rather than improving them.

It is an advantage of the present invention that the AC current is determined by multiplication of a measured magnetic field component, in contrast to systems measuring a peak current, which is then for example multiplied by the square root of 2 (approximately 1.4142), because this is only accurate if the waveform of the AC current is a perfect sinusoidal signal.

It is an advantage of the present invention that the measurement is accurate for any AC waveform, e.g. sinusoidal, square, triangular, etc.

While preferred, embodiments of the present invention are not necessarily limited to solutions wherein the accuracy is ±1.5% for frequencies in the range from 50 Hz to 1500 Hz.

In an embodiment, the thickness or residual thickness (e.g. Tp or Tres) and the distance (e.g. g) between the metal plate or metal layer and the shielding legs are such that the amplitude of the magnetic field component (e.g. Bx) of the combined first and the second magnetic field at the sensor location and oriented in the second direction (e.g. X) varies less than ±1.5% for frequencies in the range from 50 Hz to 1500 Hz.

Or stated in other words: wherein the distance (g) and a thickness (Tp, Tres) of the metal plate or metal layer are such that an attenuation of the magnetic field component (Bx) varies less than ±1.5% for frequencies up to 1500 Hz.

For example, if the plate thickness or layer thickness is fixed or predefined, suitable values for the distance "g" can be found, or an optimal value of "g" can be found. Alternatively, if the distance "g" is fixed or predetermined, suitable values for the plate thickness "Tp or Tres" can be found, or an optimal value of the plate thickness can be found. In other words, in practice one parameter may be chosen, and a suitable range for the other parameter, or an optimum value for the other parameters can be found.

It is explicitly pointed out that the claim does not only cover the most optimal solution, but also covers other "good working solutions", because these are also a considerable improvement over the prior art, e.g. in terms of a reduced amplitude variation error.

It is an advantage of this current sensor system that it allows accurate measurement of the AC electrical current, which may have frequencies up to about 1500 Hz or about 2000 Hz, in a fast and simple manner, without requiring heavy processing, without having to perform spectral analysis techniques (e.g. Fourier analysis).

In an embodiment, the thickness of the metal plate or metal layer (e.p. Tp, Tres) is at least 0.3 mm or at least 0.5 mm or at least 1.0 mm.

In an embodiment, the thickness of the metal plate or metal layer (e.p. Tp) is a value in the range from 0.5 mm to 1.5 mm.

In an embodiment, the distance (e.g. g) between the metal plate or metal layer and the shielding legs is at most 10.0 mm or at most 5.0 mm, or at most 4.0 mm, or at most 3.0 mm.

The plate thickness Tp or Tres may be a value in the range from 0.3 mm to 5.0 mm, or from 0.5 mm to 4.0 mm, or from 0.8 mm to 3.0 mm, e.g. equal to 1.0 mm, or equal to 1.5 mm, or equal to 2.0 mm.

In an embodiment, the distance (e.g. g) between the metal plate or metal layer and the shielding legs is at least 0.1 mm, or at least 0.2 mm, or at least 0.3 mm.

The magnetic sensor device may be configured for determining the AC electrical current as a value proportional to the magnetic field component value.

In an embodiment, amplitude of the magnetic field component varies less than ±1.25% for frequencies in the range from 50 Hz to 1500 Hz.

In an embodiment, the thickness or residual thickness (e.g. Tp, Tres) of the metal plate or metal layer and the distance (e.g. g) are such that amplitude of the magnetic field component (Bx) varies less than ±1.0% or less than ±0.75% for frequencies in the range from 50 Hz to 1500 Hz.

In an embodiment, the metal plate or metal layer comprises or consists of an electrically conductive but non-magnetic material.

In an embodiment, the metal plate is made from aluminium or an aluminium alloy, or from copper or a copper alloy, or from a non-magnetic stainless steel.

In an embodiment, the metal plate or metal layer is a portion of a metal plate having said thickness (e.g. Tp) and having a length (e.g. Lp) larger than a length (e.g. Lsh) of the shielding measured in the first direction (e.g. Y).

In an embodiment, the metal plate or metal layer is a portion of a metal plate having said thickness (e.g. Tp) and having a width (e.g. Wp) larger than 90% of a distance (Wsi) between inner sides of the shielding legs (or a width (Wp) larger than a distance Wso between outer surfaces of the shielding legs, or larger than 110%*Wso).

In an embodiment the metal plate or metal layer is a portion of a metal housing with a cavity (or blind opening) in the vicinity of the magnetic sensor, the metal plate or metal layer having a residual thickness (e.g. Tres) and a length (e.g. Lcav) larger than 90% of a length (e.g. Lsh) of the shielding measured in the first direction (e.g. Y).

In an embodiment the metal plate or metal layer is a portion of a metal housing with a cavity (or blind opening) in the vicinity of the magnetic sensor, the metal plate or metal layer having a width (e.g. Wcav) larger than 90% of a distance (e.g. Wsi) between inner sides of the shielding legs; or has a width (e.g. Wp) larger than a distance (e.g. Wso) between outer surfaces of the shielding legs, or larger than 110%*said distance (e.g. Wso).

In an embodiment, the thickness (e.g. Tp) or the residual thickness (e.g. Tres) of the metal plate or metal layer is a value in the range from 0.5 to 1.5 mm.

The metal plate or metal layer is galvanically separate from the electrical conductor. The metal plate or metal layer may be part of a metal housing. The metal plate or metal layer may be grounded.

The shielding is galvanically separate from the electrical conductor. The shielding may be grounded.

The magnetic sensor device may comprise a semiconductor substrate, e.g. a silicon substrate. The magnetic sensor device may be a packaged semiconductor device (also known as "chip").

The electrical conductor is arranged outside of said integrated semiconductor device.

The electrically conductive surface may be galvanically separate from said electrical conductor and from said magnetic sensor device.

The metal plate or metal layer can for example be made of copper or a copper alloy, or aluminium or an aluminium alloy.

In an embodiment, at least 90%, or at least 95% or at least 96%, or at least 97%, or at least 98%, or at least 99% of the power of the AC current is situated below 1500 Hz or below 2000 Hz.

In an embodiment the magnetic sensor device is an integrated semiconductor device (also referred to as "chip").

The magnetic sensor device may be mounted on a printed circuit board.

In an embodiment, the magnetic sensor device is configured for determining said magnitude of the AC electrical current in accordance with the formula: $I=K*Bx$, where I is the magnitude of the AC electrical current to be measured, K is a predefined constant independent of frequency, and Bx is the measured magnetic field component.

In this embodiment, the magnetic sensor device is configured for determining the AC electrical current as a value proportional to the magnetic field component value.

In an embodiment, the electrical conductor portion has a central conductor portion situated between the shielding legs, which central conductor portion is a solid beam shaped portion with a substantially constant cross-section.

With "solid beam shaped portion" is meant that the central conductor portion is not perforated, or stated in other words, does not have a slit or a hole or a through-opening causing the current flowing through the central conductor portion to be split in two discrete conductive paths, e.g. as illustrated in FIG. 1(a).

The cross section may be a rectangular cross section having a predefined width We and a height Tc.

In an embodiment, the electrical conductor portion has a central conductor portion situated between the shielding legs, and the central conductor portion has a through opening (e.g. a slit).

The sensor device is preferably located in the vicinity of said through-opening, e.g. at a distance of at most 10.0 mm from said through-opening.

In an embodiment, the magnetic sensor device comprises a vertical Hall element, configured for measuring said magnetic field component (e.g. Bx) oriented in the second direction (e.g. X).

In an embodiment, the magnetic sensor device comprises at least one magneto-resistive (MR) element, configured for measuring said magnetic field component (e.g. Bx) oriented in the second direction (e.g. X).

In an embodiment, the magnetic sensor comprises two vertical Hall elements, each configured for measuring said magnetic field component (e.g. Bx) oriented in the second direction (e.g. X).

In an embodiment, the outputs of the two vertical Hall elements may be combined (e.g. be added) to increase the signal-to-noise ratio of the measured signal.

In an embodiment, the magnetic sensor device comprises circuitry for allowing each of the vertical Hall elements to be read-out separately, e.g. for diagnostic purposes.

In an embodiment, the magnetic sensor device comprises an integrated magnetic concentrator (IMC) and two horizontal Hall elements arranged on opposite sides of the IMC, spaced apart in the second direction (e.g. X).

If the first Hall element H1 provides a signal h1, and the second Hall element provides a signal h2, the magnetic field component Bx is proportional to (h1−h2).

In an embodiment, the magnetic sensor device comprises two horizontal Hall elements (e.g. H1 and H2) on a first side of the IMC, and two horizontal Hall elements (e.g. H3 and H4) arranged on a second side of the IMC, the first side and the second side being 180° angularly spaced. The values obtained from H1 and H2 may be combined, e.g. summed or averaged to yield a first value h12, and the values obtained from H3 and H4 may be combined, e.g. summed or averaged to yield a second value h34, and the magnetic field component Bx is proportional to (h12−h34).

According to a second aspect, the present invention also provides a three-phase current sensor system for measuring three AC electrical current having frequencies in a predefined frequency range, the system comprising: a first current sensor system according to the first aspect, comprising a first electrical conductor, and a first magnetic sensor device, and a first metal plate or metal layer; a second current sensor system according to the first aspect, comprising a second electrical conductor, and a second magnetic sensor device, and a second metal plate or metal layer; and a third current sensor system according to the first aspect, comprising a third electrical conductor, and a third magnetic sensor device, and a third metal plate or metal layer. Examples of such three-phase systems are illustrated in FIG. 4 and FIG. 5.

In an embodiment (of the second aspect), the first metal plate or metal layer and the second metal plate or metal layer and the third metal plate or metal layer are integrally formed. Or stated in other words, this three-phase current sensor system comprises a single metal plate, or a single metal housing.

According to a third aspect, the present invention provides a current sensor system for measuring an AC electrical current having frequencies in a predefined frequency range, the current sensor system comprising: an electrical conductor portion extending in a first direction (e.g. Y) and configured for conducting said AC electrical current, thereby creating a first magnetic field; a U-shaped magnetic shielding partially surrounding said electrical conductor portion, and having a central shielding portion extending in a second direction (e.g. X) perpendicular to the first direction (e.g. Y), and having two shielding leg portions extending in a third direction (e.g. Z) perpendicular to the first and second direction; a metal plate or metal layer arranged at a predefined distance (e.g. g) from the shielding legs portions for allowing eddy currents to flow in said metal plate or metal layer, thereby creating a second magnetic field which is superimposed with the first magnetic field; a magnetic sensor device arranged between the conductor portion and the metal plate or metal layer, and arranged between the two shielding leg portions, and configured for measuring a magnetic field component (e.g. Bx) oriented in the second direction (e.g. X); wherein the metal plate or metal layer has a thickness (e.g. Tp or Tres) of at least 0.3 mm or at least 0.5 mm or at least 1.0 mm; and wherein the distance (e.g. g) is at most 10.0 mm or at most 5.0 mm, or at most 4.0 mm, or at most 3.0 mm.

In an embodiment (of the third aspect), the distance (g) is at least 0.1 mm or at least 0.2 mm or at least 0.3 mm.

According to a fourth aspect, the present invention also provides a three-phase current sensor system for measuring three AC electrical current having frequencies in a predefined frequency range, the system comprising: a first current sensor system according to the third aspect, comprising a first electrical conductor, and a first magnetic sensor device, and a first metal plate or metal layer; a second current sensor system according to the third aspect, comprising a second electrical conductor, and a second magnetic sensor device, and a second metal plate or metal layer; and a third current sensor system according to the third aspect, comprising a third electrical conductor, and a third magnetic sensor device, and a third metal plate or metal layer.

According to a fifth aspect, the present invention also provides a current sensor system for measuring an AC electrical current having frequencies in a predefined frequency range (e.g. the range from 50 Hz to 2000 Hz), the current sensor system comprising: an electrical conductor portion extending in a first direction (e.g. Y) and configured for conducting said AC electrical current, thereby creating a first magnetic field; a U-shaped magnetic shielding partially surrounding said electrical conductor portion, and having a central shielding portion extending in a second direction (e.g. X) perpendicular to the first direction (e.g. Y), and having two shielding leg portions extending in a third direction (e.g. Z) perpendicular to the first and second direction (e.g. X, Y); a metal plate or a metal layer arranged at a predefined distance (e.g. g) from the shielding legs portions for allowing eddy currents to flow in said metal plate or metal layer, thereby creating a second magnetic field which is superimposed with the first magnetic field; a magnetic sensor device arranged between the conductor portion and the metal plate or metal layer, and also arranged between the two shielding leg portions, and configured for measuring a magnetic field component (e.g. Bx) oriented in the second direction (e.g. X); wherein the metal plate or metal layer is arranged outside of the U-shaped magnetic shielding.

In an embodiment, the thickness or residual thickness (e.g. Tp, Tres) and the distance (e.g. g) between the metal plate or metal layer and the shielding legs are such that the amplitude of the magnetic field component (e.g. Bx) of the combined first and the second magnetic field at the sensor location and oriented in the second direction (e.g. X) varies less than ±1.5% for frequencies in the range from 50 Hz to 1500 Hz.

In an embodiment, the thickness (e.g. Tp) or the residual thickness (e.g. Tres) is at least 0.3 mm; and/or the distance (e.g. g) is at most 10.0 mm; and optionally the distance (e.g. g) is at least 0.1 mm.

In an embodiment, the thickness (e.g. Tp) or the residual thickness (e.g. Tres) of the metal plate or metal layer and the distance (e.g. g) are such that the amplitude of the magnetic field component (Bx) varies less than ±1.0% or less than ±0.75% for frequencies in the range from 50 Hz to 1500 Hz.

In an embodiment, the metal plate or metal layer comprises or consists of an electrically conductive but non-magnetic material.

In an embodiment, the residual thickness (e.g. Tres) of the metal plate or metal layer is a value in the range from 0.5 to 1.5 mm.

In an embodiment, the metal plate or metal layer is a portion of said metal housing with said cavity in the vicinity of the magnetic sensor, and at least one of the following features: (i) the metal plate or metal layer has a length (Lcav) larger than 90% of a length (Lsh) of the shielding measured in the first direction (Y); (ii) the metal plate or metal layer has a width (Wcav) larger than 90% of a distance (Wsi) between inner sides of the shielding legs.

In an embodiment, the magnetic sensor device comprises at least one vertical Hall element, configured for measuring said magnetic field component (e.g. Bx) oriented in the second direction (e.g. X).

In an embodiment, the magnetic sensor device comprises at least one magneto-resistive element configured for measuring said magnetic field component (e.g. Bx) oriented in the second direction (e.g. X).

In an embodiment, the magnetic sensor comprises two vertical Hall elements, each configured for measuring said magnetic field component (e.g. Bx) oriented in the second direction (e.g. X).

In an embodiment, the magnetic sensor device comprises an integrated magnetic concentrator (IMC) and two horizontal Hall elements arranged on opposite sides of the IMC, spaced apart in the second direction (e.g. X).

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 2(a) to FIG. 2(d) show examples of arrangements of an electrical conductor portion and a U-shaped magnetic shielding which can be used in embodiments of the present invention, e.g. in the current sensor system of FIG. 1(a).

as illustrated in FIG. 6, for three mounting positions of the sensor device.

as illustrated in FIG. 4, or as illustrated in FIG. 1(b).

FIG. 8(a) shows the amplitude variation, and FIG. 8(b) shows the phase as a function of frequency, for three mounting positions of the sensor device.

FIG. 8(c) shows the amplitude variation as a function of frequency for a fixed sensor position, for two different temperatures, and FIG. 8(d) shows the amplitude variation as a function of frequency for a fixed sensor position, for three positions of the metal plate.

as illustrated in FIG. 5, or as illustrated in FIG. 3(c).

FIG. 9(a) shows the amplitude variation as a function of frequency for two different temperatures.

FIG. 9(b) shows the amplitude variation as a function of frequency for three positions of the metal plate.

FIG. 9(c) shows the amplitude variation, and FIG. 9(d) shows the phase shift as a function of frequency for three mounting positions of the sensor device.

Figure 1A:
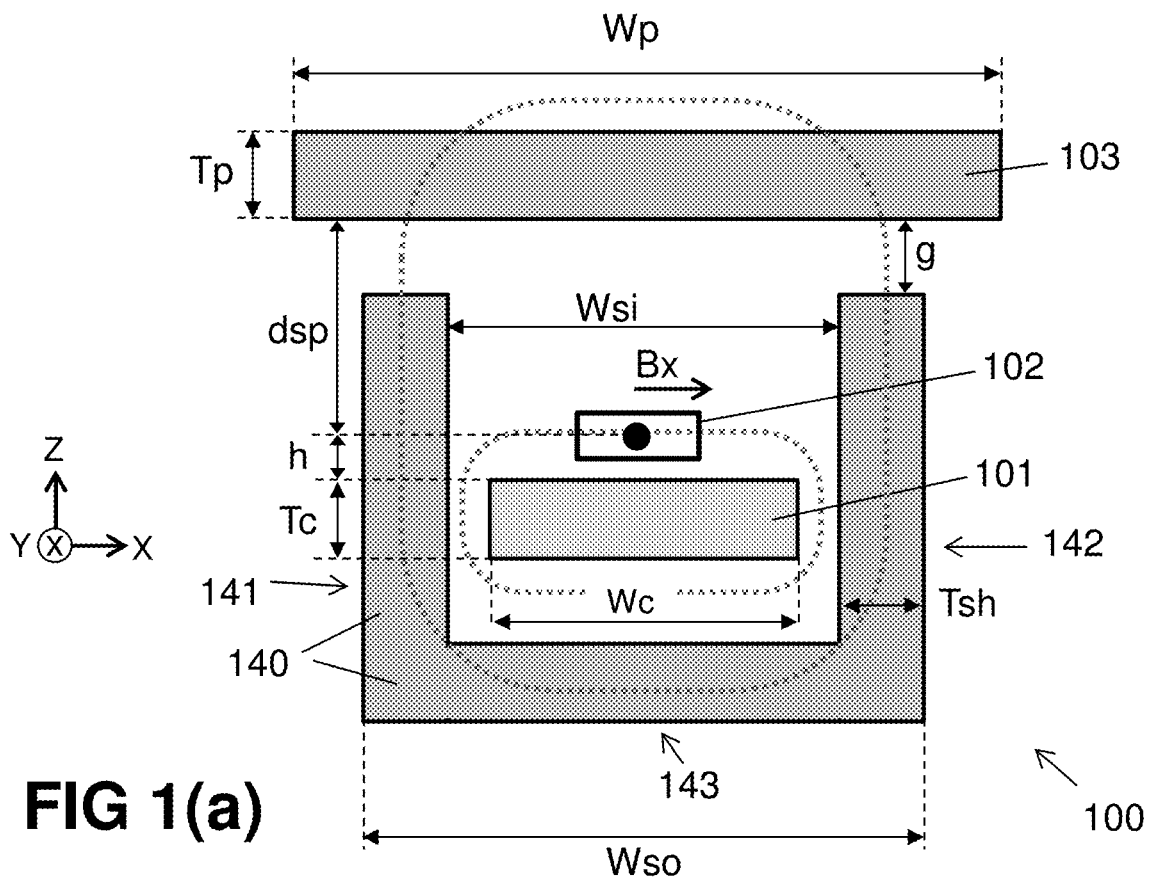
FIG. 1(a) and FIG. 1(b) illustrate a current sensor system according to an embodiment of the present invention in cross-section, and in perspective view respectively.

The drawings are only schematic and are non-limiting. In the drawings, the size of some of the elements may be exaggerated and not drawn on scale for illustrative purposes. Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention relates in general to the field of magnetic current sensor systems, and more in particular to a current sensor system capable of accurately measuring an AC current.

The AC current may have an amplitude up to about 500 or up to about 750 Amps or up to about 1000 or up to about 1500 Amps and may have frequencies up to about 1500 Hz or up to about 2 kHz. Such current sensor system may be used in industrial, robotic and automotive applications, e.g. for measuring one or more currents provided to an electrical motor, e.g. in electrical or hybrid vehicles. Such electrical motors may be driven using relatively large AC currents, for example substantially sinusoidal currents having amplitudes of tens or even hundreds of amperes. The present invention is particularly concerned with accurately measuring such AC currents.

As already mentioned in the background section, a specific problem that occurs when trying to measure AC currents having a relatively high frequency (e.g. higher than 50 Hz or 60 Hz) is that a phenomenon known as the "skin effect" occurs, which causes the current density to increase near the outer periphery of the electrical conductor, and causes the current density to decrease near the center of the electrical conductor. The inventors have found that this not only changes the effective resistance of the busbar, but also changes the magnetic field around the electrical conductor. As far as is known to the inventors, the way in which the skin effect changes the magnetic field around the conductor, cannot be easily described mathematically. As the frequency of the AC current increases, this effect becomes more and more pronounced, and a determination of the AC current as a value proportional to a measured magnetic field component or proportional to a measured magnetic field gradient, without any correction, will result in an error, which may typically amount to about 10%.

Since the error (and thus also the correction) is frequency dependent, a logical approach would be to analyse the frequency content of the AC signal to be measured and correct the measured value accordingly. But performing frequency analysis (e.g. by means of a Fourier transform) has several disadvantages, such as requiring considerable processing power, having to use a sampling window of typically at least 16 or 32 samples, thus causing a delay, etc., which is disadvantageous, especially in motor control. The inventors wanted to find another solution.

Figure 1B:
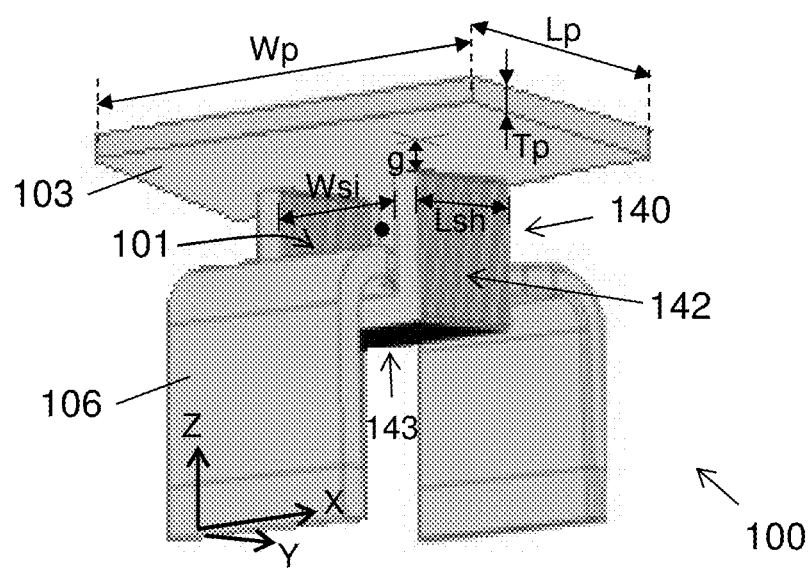

FIG. 1(a) illustrates a current sensor system 100 in cross-section, and FIG. 1(b) illustrates the current sensor system 100 in perspective view.

The current sensor system 100 comprises an electrical conductor portion 101 for conducting the AC current to be measured. The electrical conductor portion 101 extends in the Y direction. The electrical conductor portion 101 may be part of a busbar 106, and may have a rectangular cross section, optionally with rounded or truncated edges. The electrical conductor portion 101 may be solid, or may have a through-hole in the Z-direction, e.g. as illustrated in FIG. 2(a) and FIG. 2(b). The electrical conductor portion 101 may have a thickness Tc from 1.0 mm to 20.0 mm or from 1.0 mm to 5.0 mm and may have a width We from 2.0 to 50.0 mm or from 5.0 to 40 mm or from 10 to 40 mm, but these values are not critical.

When a current flows through the electrical conductor portion, a "first magnetic field" is generated. A rough sketch of some of the field lines of this first magnetic field is shown for illustrative purposes, and although the orientation and density of these field lines may not be correct, they may help to better understand the present invention.

The current sensor system 100 further comprises: a U-shaped magnetic shielding 140 partially surrounding the electrical conductor portion 101. The magnetic shielding 140 has a U-shape comprising a central shielding portion 143 situated below the electrical conductor portion 101 of FIG. 1(a), and two shielding leg portions 141, 142 oriented substantially perpendicular to the central shielding portion 143. The U-shaped shielding 140 is open at the top. The central conductor portion 101 is situated between the legs 141, 142 of the U-shaped magnetic shielding 140, or stated in other words, the magnetic shielding 140 partially surrounds the central conductor portion 101. Preferably, the electrical conductor portion 101 is situated substantially in the middle between the legs 141, 142 of the shielding 140 in the direction X. The shielding 140 shown in FIG. 1(a) has sharp edges, but alternatively may have rounded edges.

The shielding may define a distance Wsi between inner surfaces of the shielding legs 141, 142, and may define an outer width Wso in the X direction. Typical values of Wsi are 10 to 50 mm, or 10 to 30 mm, e.g. 12 to 25 mm, e.g. equal to about 15 mm. The shielding 140 may have a thickness Tsh in the range from 1.0 mm to 3.0 mm (e.g. equal to about 1.5 mm, or equal to about 2.0 mm, or equal to about 2.5 mm). The distance Wso between outer surfaces of the shielding legs 141, 142 is equal to Wsi+2*Tsh, and may have a value in the range from (10+2*1)=12 mm to (50+2*3)=56 mm. But the present invention is not limited to these values, and other values may also be used.

The current sensor system 100 further comprises: a magnetic sensor or a magnetic sensor device 102. While not shown in FIG. 1(a), the magnetic sensor device may be a packaged semiconductor device. The magnetic sensor device 102 is arranged in the vicinity of the electrical conductor portion 101, e.g. at a distance h in the range from 0.1 mm to 5.0 mm above the central conductor portion 101. The magnetic sensor 102 is preferably arranged centrally above the electrical conductor portion 101, halfway between the shielding legs 141, 142. The magnetic sensor device 102 may be configured for measuring a magnetic field component Bx oriented in the X-direction, transverse to the direction Y in which the AC current flows. The magnet sensor device 102 may be mounted on a printed circuit board (not shown) in known manners.

According to an underlying principle of the present invention, the current sensor system 100 further comprises an electrically conductive surface, e.g. an electrically conductive plate 103 or metallic plate, further referred to herein as a "metal plate" for ease of the description. The metal plate 103 is arranged at a distance "g" from the shielding legs 141, 142 in the range from about 0.0 mm to about 10.0 mm, or from 0.0 mm to 5.0 mm, or from 0.2 mm to 5.0 mm, equal to about 2.0 mm or equal to about 3.0 mm. In some embodiments, the metal plate or metal layer is in contact with the shielding legs. In other embodiments, the metal plate or metal layer 103 is not in contact with the shielding legs. The distance "dsp" between the magnetic sensor (device) 102 and the metal plate 103 may be a value in the range from 2.0 mm to 10.0 mm, or from 4.0 mm to 8.0 mm, e.g. equal to about 6.0 mm.

The metal plate 103 has a width Wp extending in the X-direction, which is preferably equal to or larger than 80% of the inner distance Wsi between the legs 141, 142 of the shield 140. This can be written mathematically as follows: Wp≥80%*Wsi. In some embodiments Wp≥90%*Wsi, or Wp≥Wsi, or Wp≥120%*Wsi, or Wp≥Wso, or Wp≥110%*Wso, or Wp≥120%*Wso.

The inventors surprisingly discovered that by adding a metal plate, the frequency characteristic of the current sensor system can be influenced. More specifically, they discovered that by arranging a metal plate 103 of a particular thickness "Tp" at a particular distance "g", the amplitude variation and phase versus frequency characteristic can be improved. For example, by adding a "full metal plate" with appropriate values "g" and "Tp", the absolute value of the amplitude variation error can be reduced from about 2.3% at 1500 Hz in FIG. 7(a) to about 1.3% at 1000 Hz in FIG. 8(a), excluding mounting tolerances.

While the inventors do not wish to be bound by any theory, a possible explanation may be the following: the AC current flowing through the electrical conductor 101 causes a first magnetic field, but the first magnetic field does not have a flat frequency characteristic due to the "skin effect". The metal plate allows "eddy currents" to flow in the metal plate 103 induced by the varying first magnetic field, and these eddy currents induce a second magnetic field which is superimposed with the first magnetic field, and a superposition of the first and second magnetic field is measured by the magnetic sensor 102.

After many experiments, the inventors found that:
i) if the metal plate or metal layer 103 is too far (e.g. g>10 mm) and/or the metal plate is too thin (e.g. Tp<0.3 mm), the second magnetic field (related to the eddy currents) undercompensates the skin effect;
ii) but very surprisingly, by choosing suitable values for the plate thickness "Tp" and plate distance "g", the overall frequency characteristic of the current sensor system 100 can be substantially improved in such a way that the second magnetic field can substantially reduce, or even largely compensate the skin effect.

The inventors are of the opinion that this could not have been predicted based on what is known in the prior art. On the contrary, eddy currents are usually considered a parasitic effect that needs to be avoided, but in this invention, the eddy currents can be used in a positive way, namely to reduce or at least partially compensate the negative effect of the skin effect.

FIG. 1(b) shows a perspective view of the sensor system 100 of FIG. 1(a). As can be seen, the length Lp of the metal plate 103 (measured in the Y-direction) is preferably equal to or larger than the length Lsh of the shielding (measured in the Y-direction).

The sensor device 102 is not shown in FIG. 1(b), but the position of the magnetic sensor is indicated by means of a black circle inside the space between the two shielding legs 141, 142 and between the electrical conductor portion 101 and the metal plate 103. As can be seen, the central electrical conductor portion 101 may be part of a U-shaped busbar 106, but that is not absolutely required for the invention to work.

FIG. 2(a) to FIG. 2(d) show examples of arrangements of an electrical conductor portion 101 and a U-shaped magnetic shielding 140 which may be used in embodiments of the present invention, e.g. in the current sensor system of FIG. 1(a) and FIG. 1(b), but also in the current sensor system 300 of FIG. 3(a) to FIG. 3(c) which will be described further.

The arrangement 200a of FIG. 2(a) shows an electrical conductor portion and a U-shaped magnetic shielding (only the shielding legs 241, 242 are visible). The electrical conductor portion has a U-shape comprising a central conductor portion 201a extending in the Y-direction, and two conductor leg portions oriented in the Z-direction, substantially perpendicular to the central conductor portion 201a. The central conductor portion 201a of FIG. 2(a) has a through-opening 207. The central conductor portion 201a may be narrowed between the shielding legs 241, 242, or stated in other words: the width of the electrical conductor portion 201a may be locally reduced between the shielding legs 241, 242, e.g. in order to increase the current density, and thus the magnitude of the magnetic field component Bx to be measured.

The arrangement of FIG. 2(b) shows another example of an electrical conductor portion 201b and a U-shaped magnetic shielding portion (only the shielding legs 241, 242 are visible). The electrical conductor portion 201b is a substantially planar portion. The magnetic shielding has a U-shape comprising a central shielding portion, not visible in FIG. 2(b), but located under the central conductor portion 201b, oriented parallel to the electrical conductor portion 201b, and has two leg portions 241, 242 oriented perpendicular to the central conductor portion 201b. The electrical conductor portion 201b is situated between the legs 241, 242 of the U-shaped magnetic shield, or stated in other words, the magnetic shielding at least partially surrounds the electrical conductor portion 201b. The central electrical conductor portion 201b has a through-opening 207. The width of the electrical conductor portion (in the X-direction) is locally reduced to increase the current density, but this is not absolutely required for the invention to work.

The arrangement of FIG. 2(c) is a variant of the arrangement of FIG. 2(a), wherein the electrical conductor portion 201c does not have a through-opening but is solid.

The arrangement of FIG. 2(d) is a variant of the arrangement of FIG. 2(b), wherein the electrical conductor portion 201d does not have a through-opening, but is solid.

These are only a few examples of arrangements, but the present invention is not limited hereto. For example, in variants (not shown) of the arrangements shown in FIG. 2(a) to FIG. 2(d) the electrical conductor portion is not locally narrowed between the legs of the U-shaped shielding, but has a constant width. The main purpose of FIG. 2(a) to FIG. 2(d) is to show that the electrical conductor portion may have a U-shape, and/or may have a through opening 207, and/or may be locally narrowed, but none of these is required.

Figure 4:
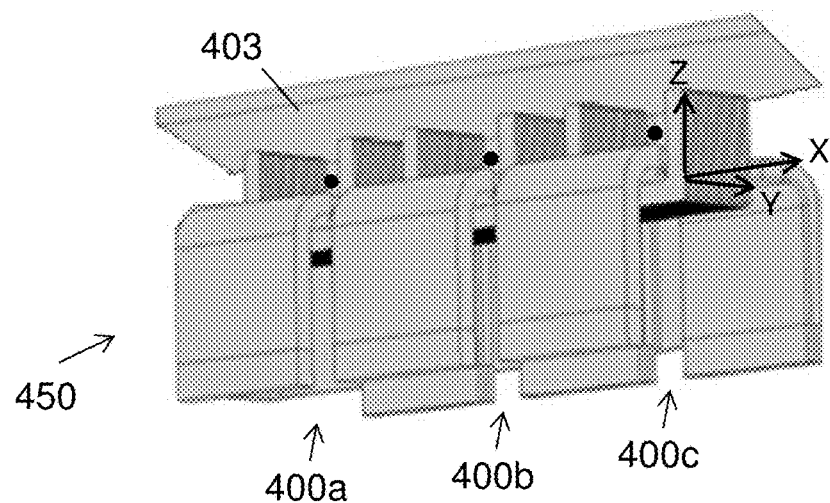
FIG. 4 shows a three-phase current sensor system according to an embodiment of the present invention. The three-phase current sensor system comprises three current sensor subsystems as illustrated in FIG. 1(b) in combination with FIG. 2(a) or FIG. 2(c). This system is also referred to herein as a "current sensor system with a full metal plate".
Figure 5:
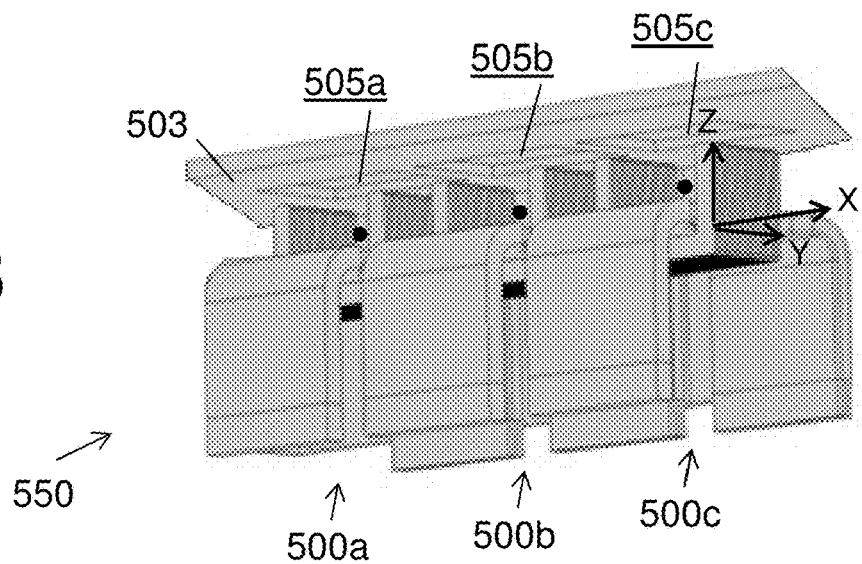
FIG. 5 shows a three-phase current sensor system according to an embodiment of the present invention. The three-phase current sensor system comprises three current sensor subsystems as illustrated in FIG. 3(c) in combination with FIG. 2(a) or FIG. 2(c). This system is also referred to herein as a "current sensor system with a metal plate with cavities".
Figure 6:
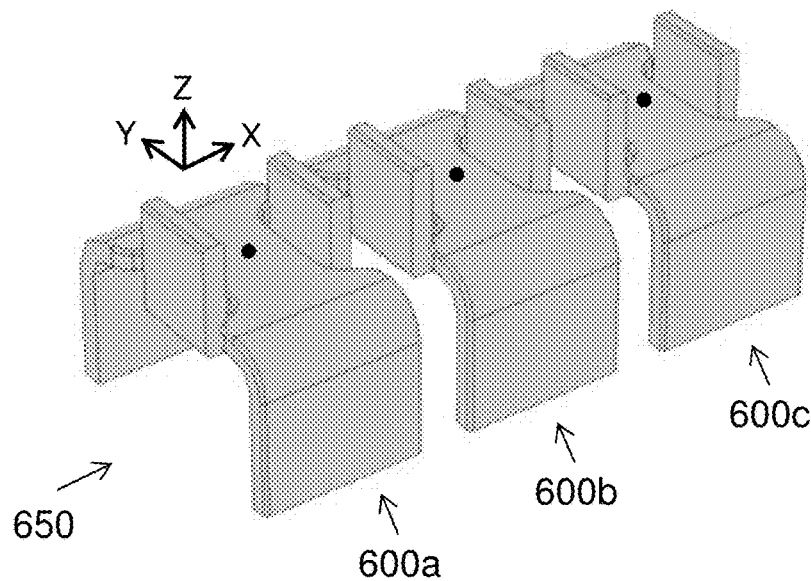
FIG. 6 shows a three-phase current sensor system comprising three arrangements without a metal plate on top. This system is also referred to herein as a "current sensor system without a metal plate". This system is provided for comparison.

It is noted that the magnetic sensor device 202 is only shown in FIG. 2(a), and is omitted from FIG. 2(b) to FIG. 2(d) for illustrative purposes. It is important, however, that the magnetic sensor device 202 is situated in the space above the central electrical conductor portion and between the shielding legs. The main purpose of the shielding legs is to prevent the magnetic sensor device 202 from measuring a disturbance field oriented in the X-direction. The latter is especially true for a three-phase system, e.g. as shown in FIG. 4 to FIG. 6, where the magnetic shieldings are configured to reduce cross-talk between the different phases.

Figure 3A:
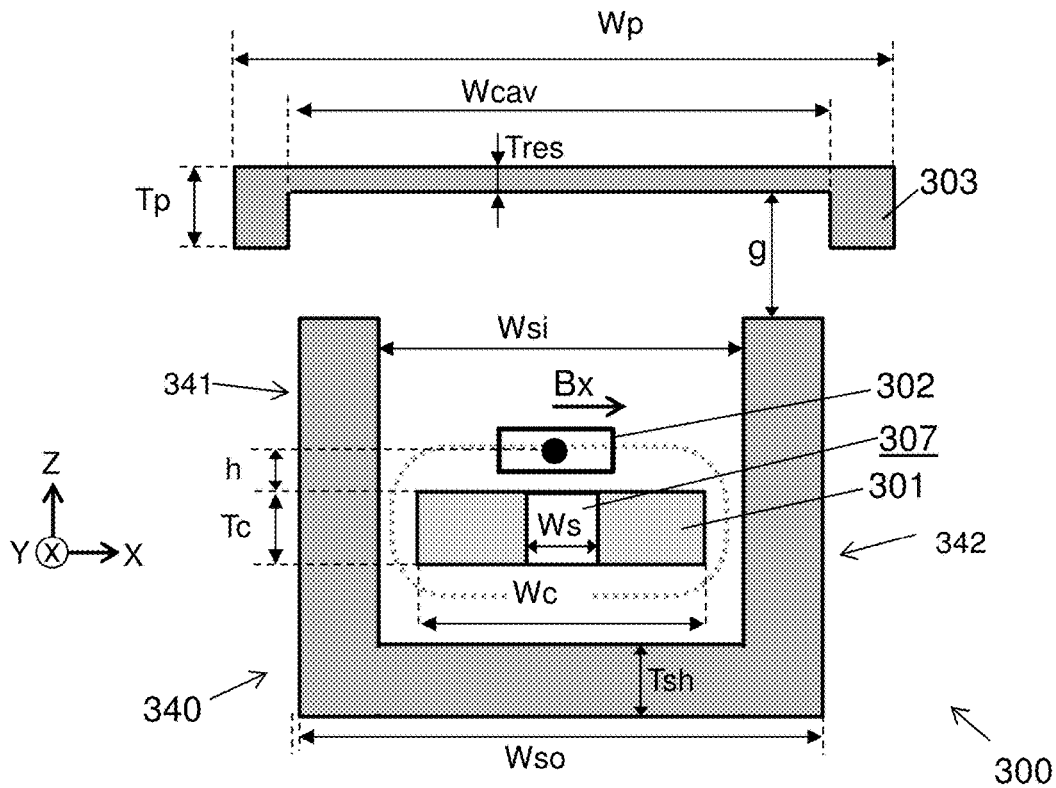
FIG. 3(a) to FIG. 3(c) illustrate a current sensor system according to another embodiment of the present invention, having a metal plate or metal layer (e.g. a metal plate) with a blind hole or a cavity.
Figure 3B:
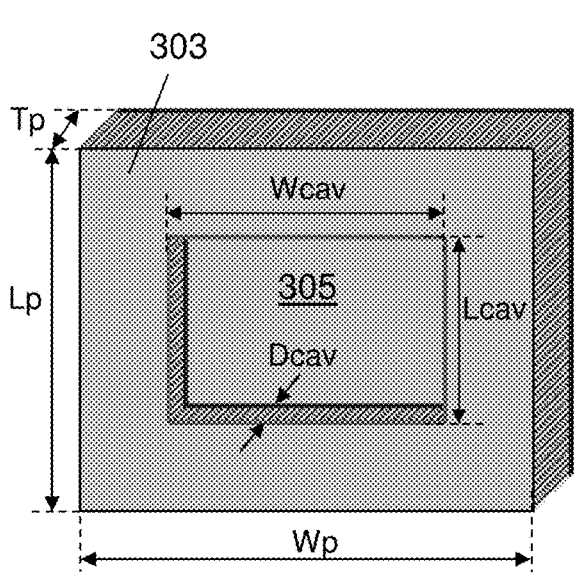
Figure 3C:
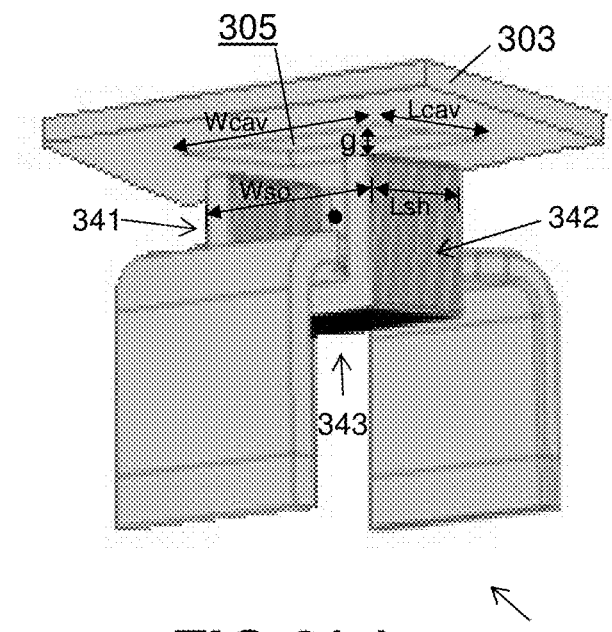

FIG. 3(a) to FIG. 3(c) illustrate a current sensor system 300 according to another embodiment of the present invention, which can be seen as a variant of the current sensor system 100 of FIG. 1(a) and FIG. 1(b), the main difference being that the current sensor system 300 has a metal or metallic surface 303 with a blind opening or cavity or recess, situated in the vicinity of the sensor device 302.

The metal plate or metal layer (e.g. metal plate) 303 has a residual thickness "Tres" which is located at a distance "g" from the legs of the U-shaped shielding 340. In other words, the metallic surface 303 may be part of a metallic housing with non-constant thickness, but the thickness "Tres" in the vicinity of the sensor device 302, and the distance "g" have the same role or meaning as the parameters "Tp" and "g" discussed above. The metal plate or metal layer may be part of a metal housing. In fact, the housing (if present) does not need to be completely metallic, but could also be made from a plastic or ceramic material, as long as it has "metallic surface portions" with a thickness "Tp" or "Tres" in the vicinity of the sensor device, e.g. above the space defined by the U-shaped shielding. In the embodiment of FIG. 3(a), the electrical conductor portion 301 is shown with a through-opening 307, but as explained above, that is not absolutely required.

In a variant of FIG. 3(a), the sensor device has a semiconductor substrate oriented parallel with the Z direction and parallel with the Y-direction. This sensor device may comprise a single horizontal Hall element for measuring the Bx-component (oriented perpendicular to the semiconductor substrate.

FIG. 3(b) shows a perspective view of a metal plate 303 with a cavity 305 for reducing the thickness of the plate "above the sensor device", as may be used in the current sensor system 300 of FIG. 3(a). The cavity 305 shown has a rectangular shape having a width "Wcav" and a length "Lcav", but this shape is not critical for the invention to work, and another shape, e.g. an elliptical shape or a circular shape or a polygonal shape may also be used.

FIG. 3(c) shows a perspective view of the current sensor system 300 of FIG. 3(a). As can be seen, the main difference between FIG. 3(c) and FIG. 1(b) is that the metal plate of FIG. 3(c) has a cavity 305. In case of a rectangular cavity, the width of the cavity Wcav is preferably at least 70% or at least 80% or at least 90% or at least 100% of the distance Wsi between the shielding legs, or at least equal to the outer distance Wso of the shielding legs; and the length of the cavity Lcav is preferably equal to or larger than the length Lsh of the shielding. As explained above, important parameters are the remaining thickness "Tres" of the metallic surface, and the distance "g" between the legs of the shielding and the metallic surface. In the specific example of FIG. 3(c), Wso=21 mm, and the width Wcav of the cavity is 25.2 mm, the length Lcav is 16.6 mm, the residual thickness of the plate Tres is 1.0 mm, and the distance "g" between the shielding legs and the plate is 2.3 mm, but of course the present invention is not limited to these specific values. In other embodiments, the value of "g" may be a value in the range from 1.0 mm to 3.0 mm.

FIG. 4 shows a three-phase current sensor system 450 according to an embodiment of the present invention. The three-phase current sensor system 450 comprises three current sensor subsystems 400a, 400b, 400c as illustrated in FIG. 1(b), arranged side by side, such that the three electrical conductor portions extend in the Y-direction, and the central shielding portions are aligned and extend in the X-direction. The system 450 is also referred to herein as a "current sensor system with a full metal plate", where "full" means "not having a cavity". This system can be used to measure three AC currents, typically denoted as Iu, Iv, Iw, flowing through the respective busbars.

The current sensor system 450 contains three magnetic sensors, one for each subsystem, the locations of which are indicated by a black dot. Each magnetic sensor is configured for measuring a respective magnetic field component Bx oriented in the X-direction. The respective current can then be calculated as I=Bx*K, where K is a predefined constant, which may be determined for example by simulation, by measurement, or by calibration, and may be hardcoded, or may be stored in a non-volatile memory of the respective sensor device. Suitable magnetic sensor devices may be capable of measuring a magnetic field component generated by currents up to about 750 Amps or up to 1500 Amps with a non-linearity error smaller than 0.2%.

It was found that the crosstalk between the different phases of this current sensor system 450 was smaller than 1%, thanks to the presence of the magnetic shields.

In the example of FIG. 4, the system 450 contains a single metal plate 403 extending over the three subsystems, and having a constant thickness Tp. In practice, the metal plate 403 may be part of a metal housing (not shown) shaped to protect the magnetic sensor devices mechanically and/or for EMC (electro-magnetic interference). The three sensor devices may be mounted on a single printed circuit board (not shown). Simulation results of the current sensor system 450 of FIG. 4 will be provided in FIG. 8(a) to FIG. 8(d).

The distance between the magnetic shields of two adjacent subsystems (in the X-direction) may be a value in the range from 1 mm to 100 mm, e.g. from 2 mm to 50 mm, e.g. from 5 mm to 25 mm, e.g. 10 mm, but the present invention is not limited hereto, and other values may also be used.

FIG. 5 shows a three-phase current sensor system 550 according to an embodiment of the present invention. The three-phase current sensor system 550 of FIG. 5 comprises three current sensor subsystems 500a, 500b, 500c as illustrated in FIG. 3(c) arranged side by side, such that the three electrical conductor portions extend in the Y-direction, and the central shielding portions are aligned and extend in the X-direction. The system 550 is also referred to herein as a "current sensor system with a metal plate with cavities". The current sensor system 550 of FIG. 5 is a variant of the current sensor system 450, the main difference being that the metal plate 503 has three cavities 505a, 505b, 505c having a residual thickness "Tres" as explained above in FIG. 3(a) to FIG. 3(c). Simulation results of the current sensor system 550 of FIG. 5 will be provided in FIG. 9(a) to FIG. 9(d).

In a variant of FIG. 5, the metal plate 503 may have a single cavity extending over the three subsystems. Such a system would provide substantially the same accuracy but may have a reduced mechanical robustness.

FIG. 6 shows a three-phase current sensor system 650 comprising three arrangements 600a, 600b, 600c as without a metal plate. The system 650 is also referred to herein as a "current sensor system without a metal plate". This system is provided as a point of reference (or baseline) for comparison. Simulation results of the current sensor system 650 of FIG. 6 will be provided in FIG. 7(a) and FIG. 7(b).

FIG. 7(a) to FIG. 10(b) show simulation results. Unless explicitly mentioned otherwise, the simulations assume an environmental temperature of 25° C.

Figure 7A:
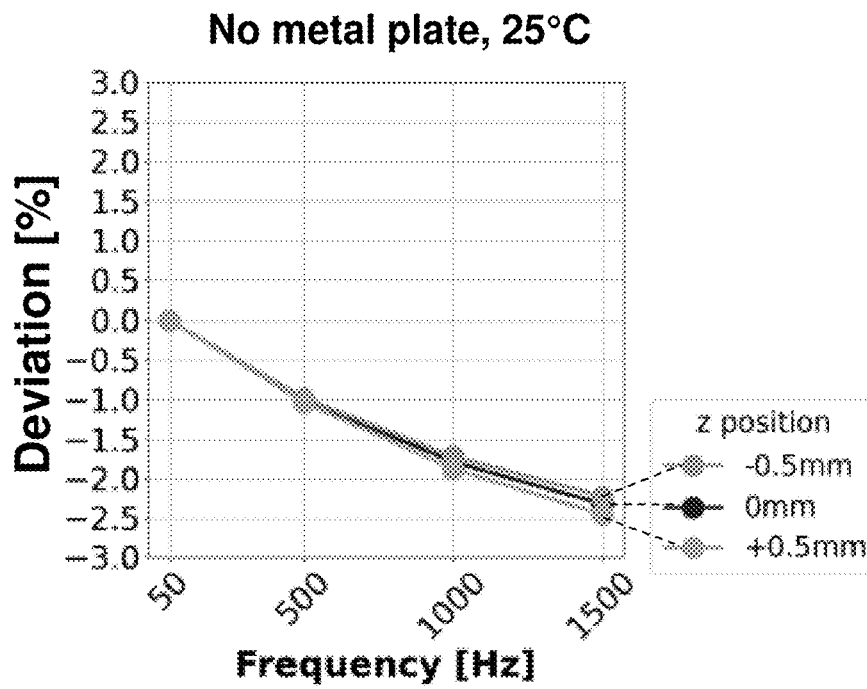
FIG. 7(a) and FIG. 7(b) show computer simulations results for a "current sensor system without a metal plate", e.g.
Figure 7B:
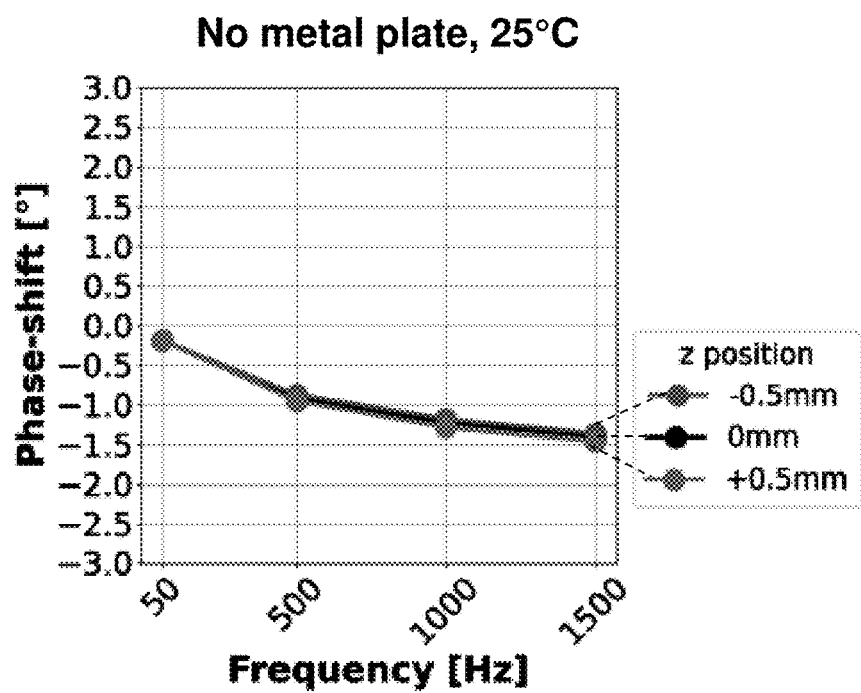

FIG. 7(a) and FIG. 7(b) show computer simulations results for a "current sensor system without a metal plate", e.g. as illustrated in FIG. 6. These curves may be considered as "reference curves" that had to be improved. FIG. 7(a) shows the amplitude variation as a function of frequency. FIG. 7(b) shows the phase shift as a function of frequency. In fact, three curves are shown, each associated with a different mounting position (in the Z-direction) of the magnetic sensor device, to show the impact of mounting tolerances of this system. As can be seen, the simulated curves are substantially overlapping, which illustrates the negligible influence of mounting tolerances of the sensor device of this system. As can also be seen, the magnetic field (and thus the value of the current) at 1500 Hz is attenuated by approximately −2.3% (for the central curve corresponding to the envisioned mounting position without offset in the Z-direction), and is phase shifted by approximately −1.4° at 1500 Hz.

Figure 8A:
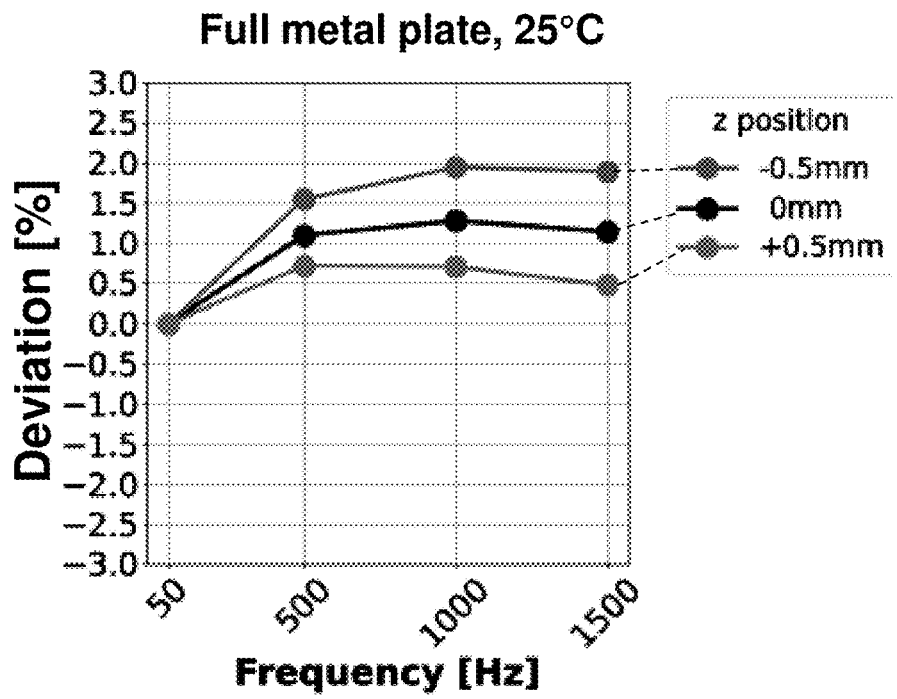
FIG. 8(a) to FIG. 8(d) show computer simulations results for a "current sensor system with a full metal plate", e.g.
Figure 8B:
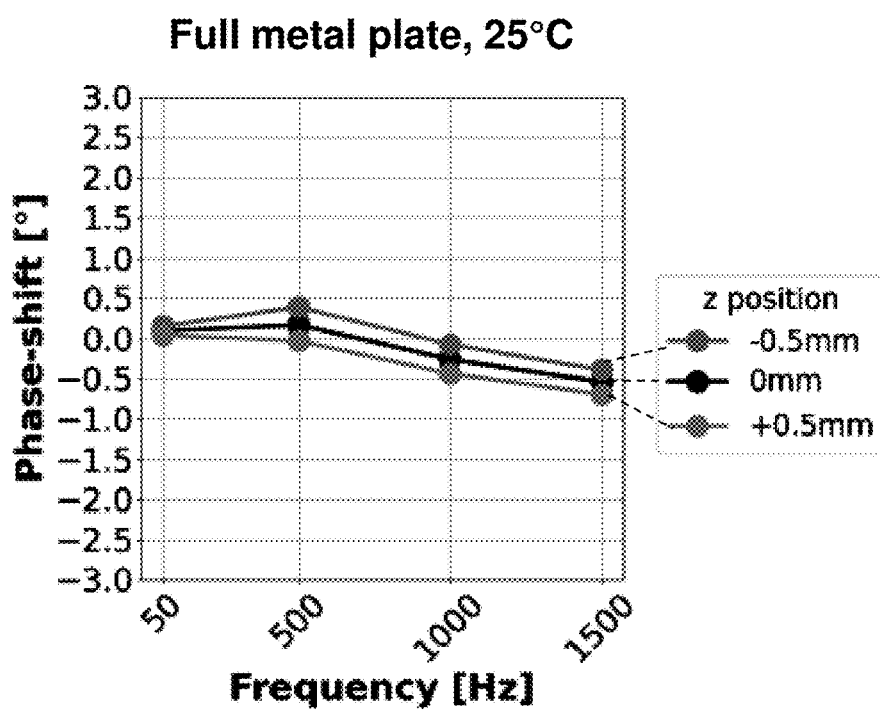

FIG. 8(a) and FIG. 8(b) show computer simulations results for a "current sensor system with full metal plate", e.g. as illustrated in FIG. 1(b) or FIG. 4, using a distance (or air gap) "g" between the metal plate and the legs of the shielding of 2.3 mm, and using a plate thickness "Tp" of 2.5 mm. It is noted that these values are not the optimal values, as will be further explained in FIG. 10(a) and FIG. 10(b), but nevertheless, they provide a significant reduction of the amplitude variation error and phase error (for a correct mounting of the sensor device).

FIG. 8(a) shows the amplitude variation as a function of frequency. The central curve, corresponding to a correct mounting position of the sensor device, has a maximum amplitude variation error of about 1.3% (in absolute value). As can be seen, however, the performance of this current sensor system with g=2.3 mm and Tp=2.5 mm is quite sensitive to mounting tolerances.

FIG. 8(b) shows the phase shift as a function of frequency. The central curve, corresponding to a correct mounting position of the sensor device, has a maximum phase shift error of about 0.5° (in absolute value), which is not perfect, but an improvement with respect to the simulations of FIG. 7(a) and FIG. 7(b).

Figure 8C:
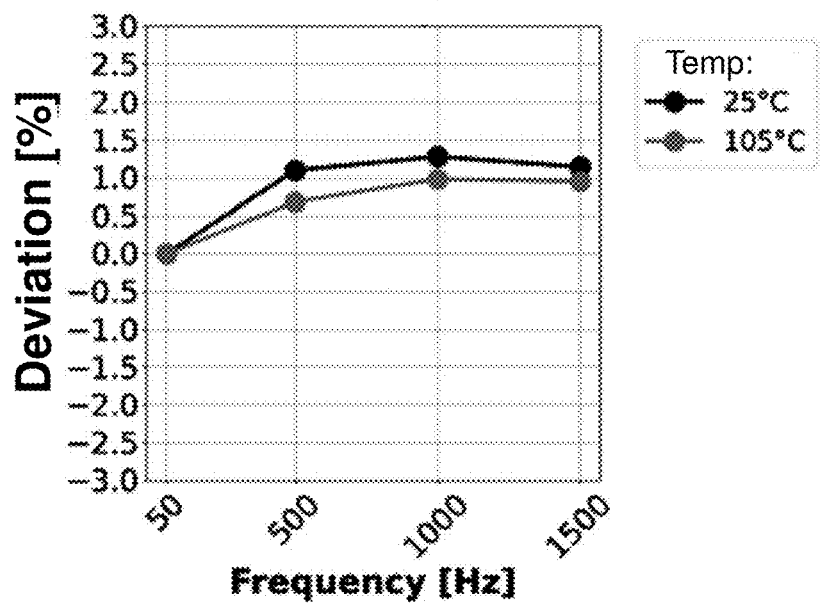

FIG. 8(c) shows the amplitude variation as a function of frequency for a fixed sensor position, but for two different temperatures, showing that the amplitude variation error is dependent on temperature.

Figure 8D:
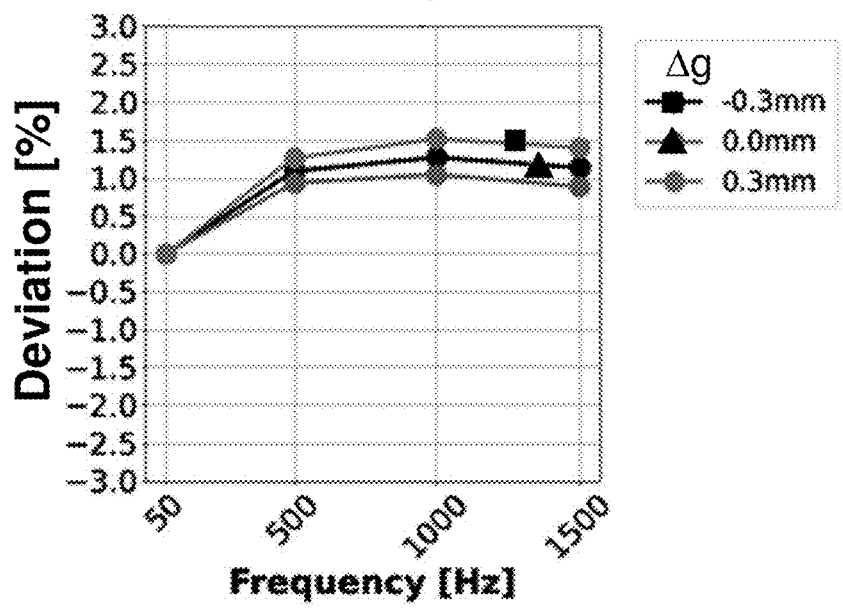

FIG. 8(d) shows the amplitude variation as a function of frequency for a fixed sensor position, but for three positions of the metal plate.

It can be concluded from FIG. 8(a) to FIG. 8(d) that, even though the metal plate of this current sensor system was not optimized, it still provides a considerable improvement over the system without a metal plate, in terms of flattening the amplitude variation and phase curves, or in terms of reducing the maximum amplitude variation error or phase error, from DC to about 1500 Hz, if the mounting tolerances are sufficiently low.

FIG. 9(a) to FIG. 9(d) show computer simulations results for a "current sensor system with a metal plate with cavities", e.g. as illustrated in FIG. 3(c) and FIG. 5, using a distance (or air gap) "g" between the metal plate and the legs of the shielding of 2.3 mm, and using a residual plate thickness "Tres" of 1.0 mm. The position and residual thickness of the metal plate of this current sensor system is optimized, as will be explained further in FIG. 10(a) and FIG. 10(b).

Figure 9A:
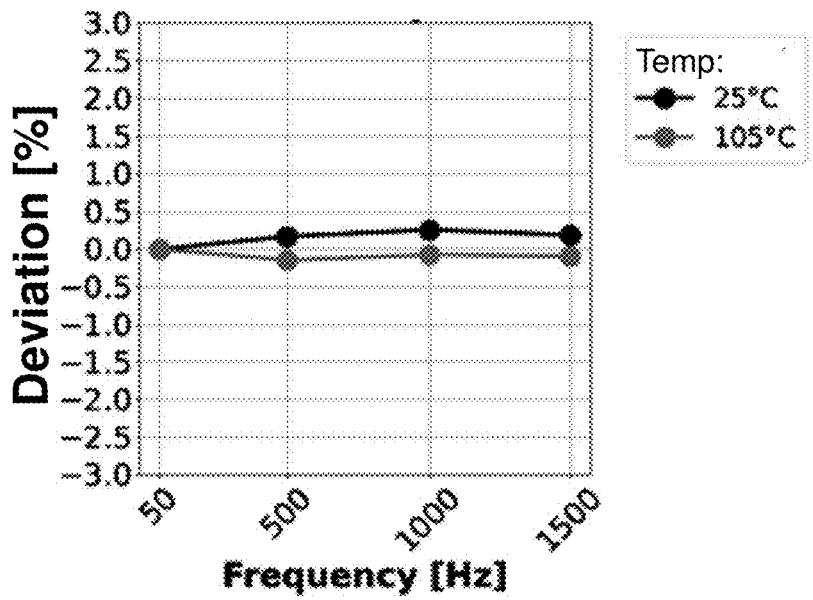
FIG. 9(a) to FIG. 9(d) show computer simulations results for a "system with a metal plate with cavities", e.g.

FIG. 9(a) shows the amplitude variation as a function of frequency for a fixed mounting position of the sensor device, and for two different temperatures. As can be seen, the amplitude variation curves are substantially flat, and the maximum amplitude variation error is less than 0.3% (in absolute value) from DC to about 1500 Hz, and for temperatures ranging from 25° C. to 105° C., which is a major improvement as compared to FIG. 8(c), where the maximum error was about 1.3%.

Figure 9B:
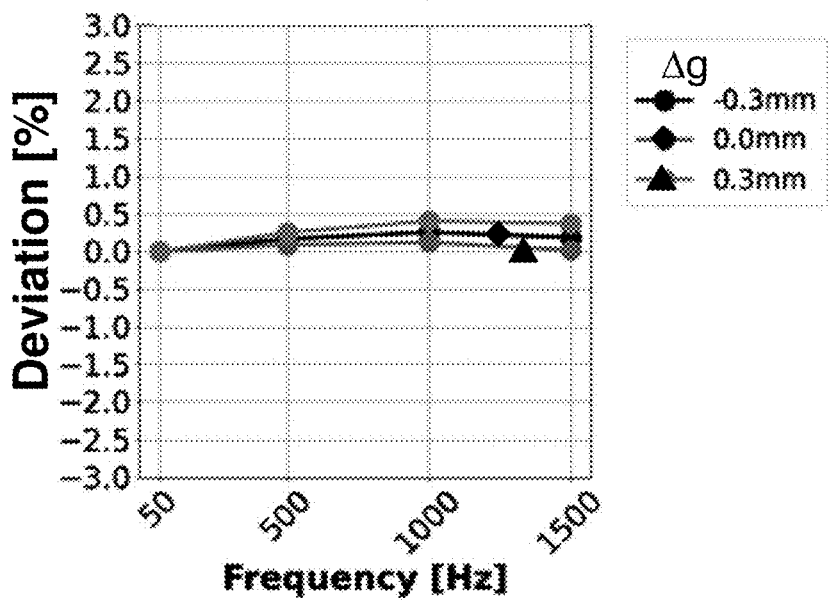

FIG. 9(b) shows the amplitude variation as a function of frequency for a fixed mounting position of the sensor device, but for three distances between the metal plate and the shielding. As can be seen, the maximum error is about 0.4% in FIG. 9(b), which is a major improvement as compared to FIG. 8(d), where the maximum error was about 1.5%.

Figure 9C:
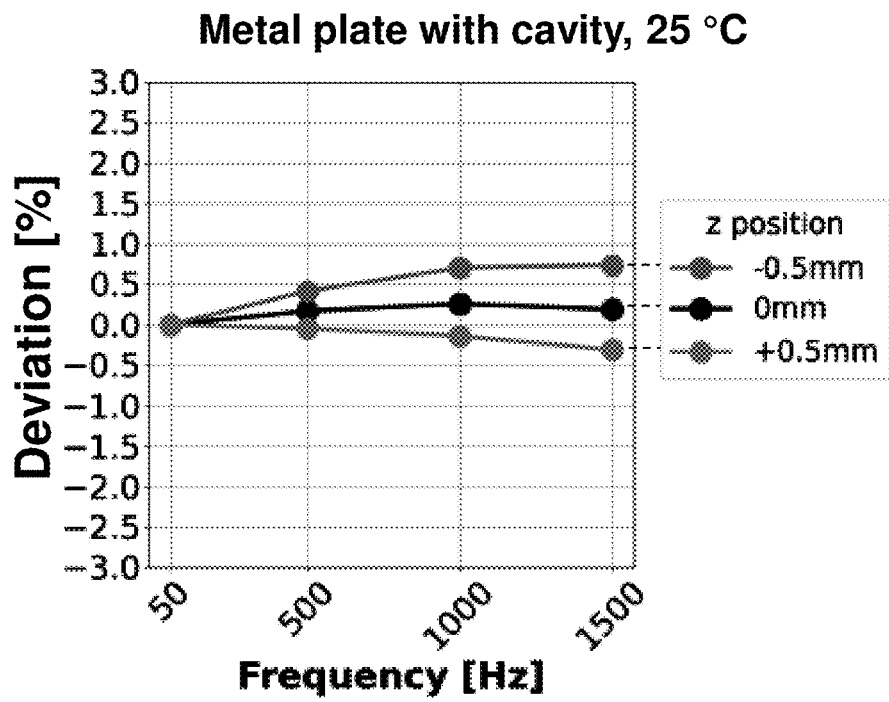
Figure 9D:
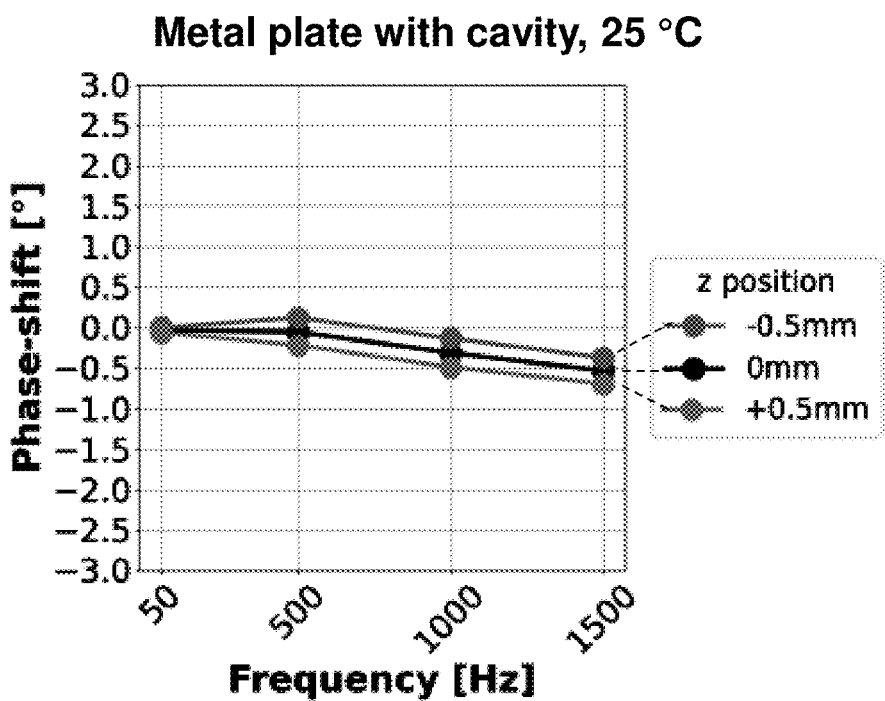

FIG. 9(c) shows the amplitude variation, and FIG. 9(d) shows the phase shift as a function of frequency for three different positions of the sensor device. As can be seen, the maximum amplitude variation error of the central curve (corresponding to correct mounting position of the sensor device) is only about 0.3% in FIG. 9(c), which is a considerable improvement compared to the 1.3% error of FIG. 8(a). And the maximum phase error of the central curve is about 0.5° in FIG. 9(d), which is comparable to the 0.5° of FIG. 8(b).

It can be concluded from FIG. 9(a) to FIG. 9(d) that the system with a "metal plates with cavities", wherein "g" and "Tres" are optimized, has a reduced amplitude variation error and phase error (for correct mounting of the sensor device and the metal plate), but also that the amplitude variation error and phase error remain very small (smaller than 0.8% and smaller than 0.8° in absolute value) for mounting tolerances of the sensor device of ±0.5 mm.

Figure 10A:
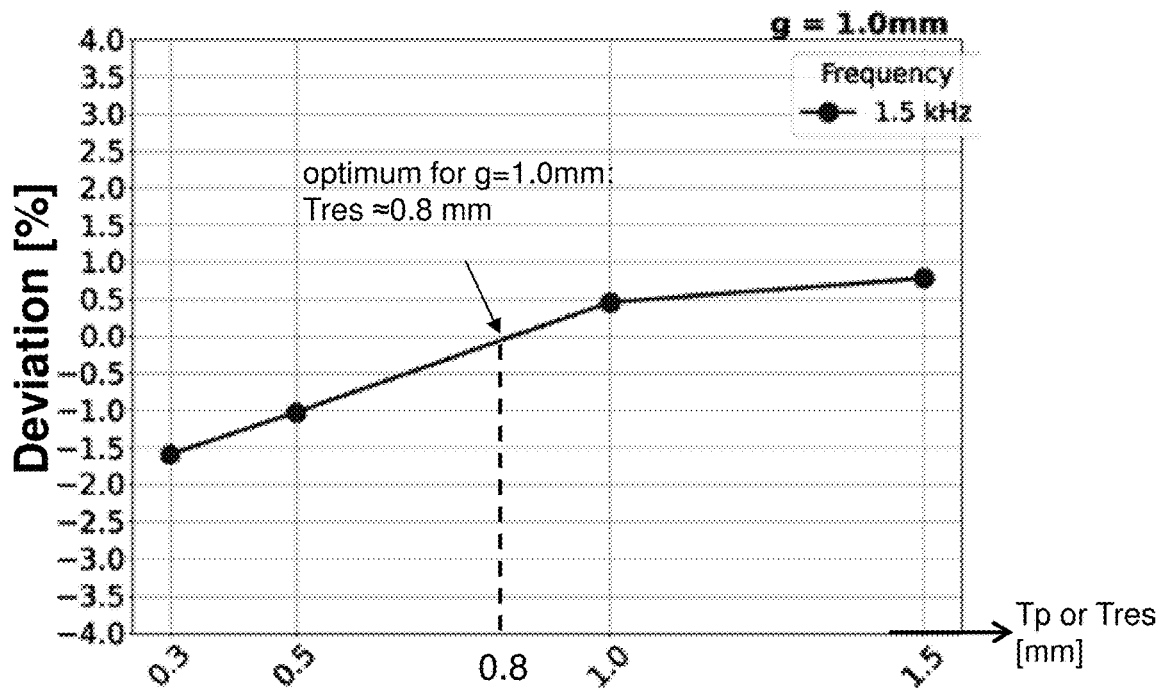
FIG. 10(a) shows the amplitude variation at 1500 Hz as a function of the plate thickness (Tp) of a "full metal plate" or the residual plate thickness (Tres) of a "metal plate with a cavity" for a fixed distance "g" of 1.0 mm between the metal plate and the legs of the U-shaped shielding.
Figure 10B:
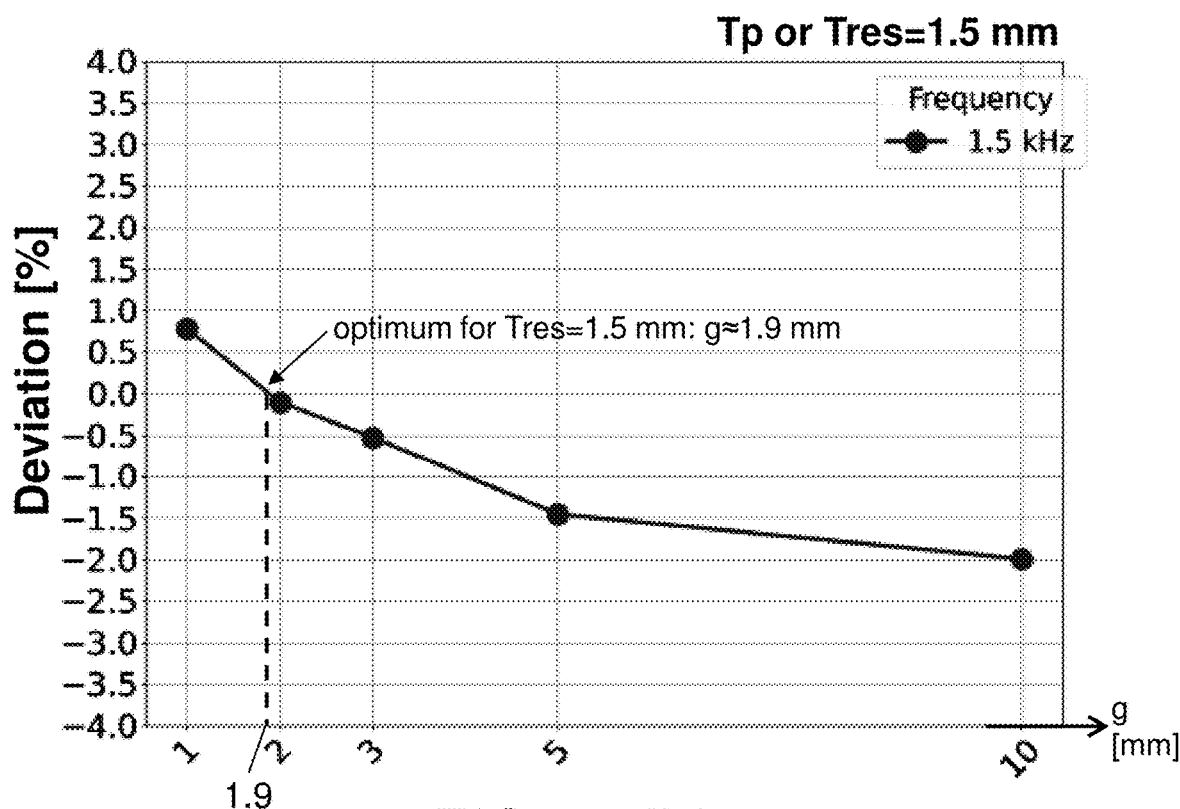
FIG. 10(b) shows the amplitude variation at 1500 Hz as a function of the distance "g" between the metal plate and the legs of the U-shaped shielding plate, for a fixed plate thickness (Tp) of a "full metal plate" or a fixed residual plate thickness (Tres) of a "metal plate with a cavity", equal to 1.5 mm.

FIG. 10(a) and FIG. 10(b) show, by way of two examples, how the plate distance (g) and the plate thickness (Tp) or the residual plate thickness (Tres) may be optimized. While at first sight, two parameters are involved, in practice, one parameter is predefined, or chosen based on other criteria (e.g. weight or sufficient mechanical stiffness), thus only one parameter needs to be optimized.

FIG. 10(a) shows the amplitude variation error of a "current sensor system with a metal plate with cavity", at 1500 Hz for a given distance "g" between the metal plate and the shielding legs. This graph allows to optimize the value of the plate thickness for the given value of "g". As can be seen, the amplitude variation error is smaller than 1.6% (in absolute value) for values of Tres from about 0.3 mm to 1.5 mm (and probably also larger, but not simulated). When considering solutions with an amplitude variation error smaller than 1.5% (in absolute value) as satisfactory, it can be seen that all values of Tres in the range from about 0.33 mm to 1.5 mm are good values.

It can also be seen that the optimum value of Tres for a (given) value g=1.0 mm is approximately Tres=0.8 mm.

The skilled person, having the benefit of the present disclosure, can easily find an optimum value of Tp or Tres for another (given) value of "g", in a similar manner. This graph also confirms the statement above, that the metal plate cannot sufficiently compensate the skin effect if the plate thickness is "too small" (e.g. smaller than 0.3 mm).

FIG. 10(b) shows the amplitude variation error of a "current sensor system with a metal plate with cavity", at 1500 Hz for a given residual plate thickness Tres equal to 1.5 mm. This graph allows to optimize the distance "g" between the plate and the magnetic shielding for this given value of Tres.

As can be seen, the optimum value of "g" is approximately equal to 1.9 mm, but other values of g smaller than about 5.0 mm also offer very good results, in particular: an amplitude variation error smaller than 1.5% in absolute value.

The skilled person, having the benefit of the present disclosure, can easily find an optimum value of "g" for another (given) value of Tp or Tres, in a similar manner. This graph also confirms the statement above, that the distance "g" should not be too large (e.g. smaller than 5.0 mm in this example).

For completeness, it is noted that the curves of FIG. 10(a) and FIG. 10(b) are simulated only at 1500 Hz, which may not provide the worst-case situation, but this can easily be addressed for example, by performing simulations at 500 Hz and at 1000 Hz. The three resulting curves may then be combined, yielding an amplitude variation range instead of a single value. The optimum value of Tres may then for example be chosen as the smallest amplitude variation range centred at 0%.

It is also noted that the curves of FIG. 10(a) and FIG. 10(b) are performed for Aluminium as the material of the metal plate, but the present invention is not limited thereto, and the metal plate can also be made from Aluminium alloy, or Copper, or a Copper alloy, or from stainless steel 316L. The skilled person having the benefit of the present invention, in particular, after being told that the frequency response of the current sensor system can be influenced by mounting a "full metal plate" or a "metal plate with a cavity" in the vicinity of the sensor device while leaving a gap "g" between the metal plate and the legs of the shielding, can easily find suitable values for the distance "g" and the plate thickness. Indeed, the parameter "g" can be optimized for a given or chosen plate thickness, or vice versa, the parameter "Tp" or "Tres" can be optimized for a given or chosen distance "g".

Figure 11:
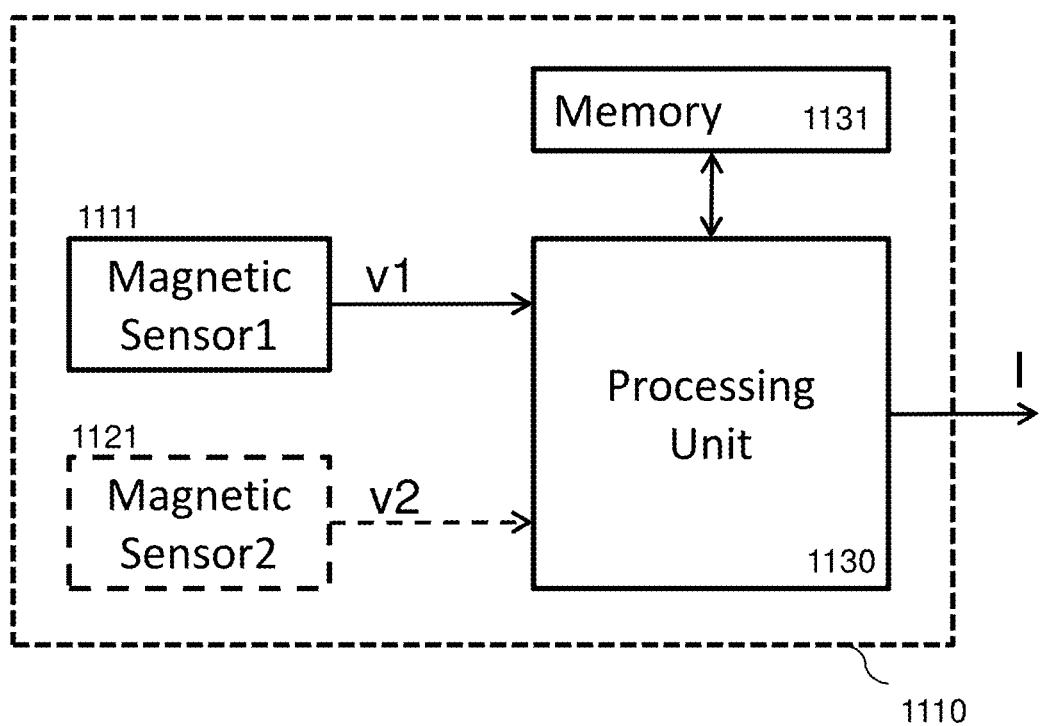
FIG. 11 shows an illustrative block-diagram of a sensor device which may be used in embodiments of the present invention, e.g. in any of the current sensor systems of FIG. 1(a) to FIG. 5.

FIG. 11 shows a high-level block-diagram of a magnetic sensor device 1110 that may be used in current sensor devices described above. The circuit 1110 may comprise a silicon substrate. The circuit 1110 comprises at least one magnetic sensor element 1111, e.g. at least one horizontal Hall element, or at least one vertical Hall element, or at least one magneto-resistive (MR) element. The sensor device is configured for measuring a magnetic field component Bx oriented in the X-direction, e.g. parallel to the silicon substrate.

In a particular embodiment, the sensor device comprises an integrated magnetic concentrator (IMC) and two horizontal Hall elements, arranged on opposite sides of the IMC, providing signals h1 and h2 respectively. In this case, the magnetic field component Bx may be calculated as a value proportional to (h1−h2).

In another embodiment, the sensor device comprises a single vertical Hall element, providing a signal v1. In this case, the magnetic field component Bx may be calculated as a value proportional to v1.

The processing unit 1130 may be adapted for determining the current to be measured in accordance with the formula: I=K*v1, or in accordance with the formula I=K·(h1−h2), where K is a predefined constant, which may be determined during design, by simulation, or during an evaluation or calibration phase). The subtraction may be done in hardware before amplification or after amplification or can be performed in the digital domain. The processing unit 1130 may comprise a digital processor comprising or connected to a non-volatile memory 1131 storing said at least one constant value K.

The circuit 1110 may further comprise one or more of the following components: a biasing circuit, a readout circuit, an amplifier or differential amplifier, an analog-to-digital convertor (ADC), etc. The ADC may be part of a digital processor circuit.

The current to be measured may be provided as an analog output signal proportional to the current, or may be provided as a digital signal indicative of the current to be measured, for example via a digital data interface, for example a serial data bus (e.g. using the I2C protocol, or using RS232 protocol, or any other suitable protocol).

The invention claimed is:

1. A current sensor system for measuring an AC electrical current having frequencies in a predefined frequency range, the current sensor system comprising:
   an electrical conductor portion extending in a first direction and configured for conducting said AC electrical current, thereby creating a first magnetic field;
   a U-shaped magnetic shielding partially surrounding said electrical conductor portion, and having a central shielding portion extending in a second direction perpendicular to the first direction, and having two shielding leg portions extending in a third direction perpendicular to the first and second direction;
   a metal plate or a metal layer arranged at a predefined distance from the shielding leg portions for allowing eddy currents to flow in said metal plate or metal layer, thereby creating a second magnetic field which is superimposed with the first magnetic field;
   a magnetic sensor device arranged between the conductor portion and the metal plate or metal layer, and arranged inside a space between the two shielding leg portions of the U-shaped magnetic shielding, and configured for measuring a magnetic field component oriented in the second direction;
   wherein the metal plate or metal layer has a length larger than a length of the shielding measured in the first direction, and a width larger than 90% of a distance between inner sides of the shielding leg portions, and a thickness; or
   the metal plate or metal layer is a portion of a metal housing with a cavity in the vicinity of the magnetic sensor, the cavity defined by the metal plate or metal layer having a reduced thickness relative to the metal housing.

2. The current sensor system according to claim 1, wherein the thickness or reduced thickness and the predefined distance from the shielding leg portions to the metal plate or metal layer are such that the amplitude of the magnetic field component of the combined first and the second magnetic field at the sensor location and oriented in the second direction varies less than +1.5% for frequencies in the range from 50 Hz to 1500 Hz.

3. The current sensor system according to claim 1, wherein the thickness or reduced thickness is at least 0.3 mm; and/or
   wherein the predefined distance from the shielding leg portions to the metal plate or metal layer is at most 10.0 mm;
   and optionally wherein the predefined distance from the shielding leg portions to the metal plate or metal layer is at least 0.1 mm.

4. The current sensor system according to claim 1, wherein the thickness or reduced thickness of the metal plate or metal layer and the predefined distance from the shielding leg portions to the metal plate or metal layer are such that the amplitude of the magnetic field component varies less than +1.0% or less than +0.75% for frequencies in the range from 50 Hz to 1500 Hz.

5. The current sensor system according to claim 1, wherein the metal plate or metal layer comprises or consists of an electrically conductive but non-magnetic material.

6. The current sensor system according to claim 1, wherein the metal plate or metal layer is a portion of said metal housing with said cavity in the vicinity of the magnetic sensor, and at least one of the following features:
   i) wherein the metal plate or metal layer has a length larger than 90% of a length of the shielding measured in the first direction;
   ii) wherein the metal plate or metal layer has a width larger than 90% of a distance between inner sides of the shielding leg portions.

7. The current sensor system according to claim 1, wherein the reduced thickness of the metal plate or metal layer is a value in the range from 0.5 to 1.5 mm.

8. The current sensor system according to claim 1, wherein the magnetic sensor device is configured for determining said magnitude of the AC electrical current in accordance with the formula: I=K*Bx, where I is the magnitude of the AC electrical current to be measured, K is a predefined constant independent of frequency, and Bx is the measured magnetic field component.

9. The current sensor system according to claim 1, wherein the electrical conductor portion has a central conductor portion situated between the shielding leg portions, which central conductor portion is a solid beam shaped portion with a substantially constant cross-section.

10. The current sensor system according to claim 1, wherein the electrical conductor portion has a central conductor portion situated between the shielding leg portions, which central conductor portion has a through opening.

11. The current sensor system according to claim 1, wherein the magnetic sensor device comprises at least one vertical Hall element, configured for measuring said magnetic field component oriented in the second direction; or
wherein the magnetic sensor device comprises at least one magneto-resistive element configured for measuring said magnetic field component oriented in the second direction.

12. The current sensor system according to claim 1, wherein the magnetic sensor comprises two vertical Hall elements, each configured for measuring said magnetic field component oriented in the second direction; or
wherein the magnetic sensor device comprises two horizontal Hall elements, spaced apart in the second direction.

13. A three-phase current sensor system for measuring three AC electrical current having frequencies in a predefined frequency range, the three-phase current sensor system having first, second and third current sensors of claim 1, comprising:
the first current sensor system comprising a first electrical conductor, and a first magnetic sensor device, and a first metal plate or metal layer;
the second current sensor system comprising a second electrical conductor, and a second magnetic sensor device, and a second metal plate or metal layer;
the third current sensor system according comprising a third electrical conductor, and a third magnetic sensor device, and a third metal plate or metal layer.

14. The three-phase current sensor system according to claim 13, wherein the first metal plate or metal layer and the second metal plate or metal layer and the third metal plate or metal layer are integrally formed.

15. A current sensor system for measuring an AC electrical current having frequencies in a predefined frequency range, the current sensor system comprising:
an electrical conductor portion extending in a first direction and configured for conducting said AC electrical current, thereby creating a first magnetic field;
a U-shaped magnetic shielding partially surrounding said electrical conductor portion, and having a central shielding portion extending in a second direction perpendicular to the first direction, and having two shielding leg portions extending in a third direction perpendicular to the first and second direction;
a metal plate or a metal layer arranged at a predefined distance from the shielding leg portions for allowing eddy currents to flow in said metal plate or metal layer, thereby creating a second magnetic field which is superimposed with the first magnetic field;
a magnetic sensor device arranged between the conductor portion and the metal plate or metal layer, and arranged inside a space between the two shielding leg portions of the U-shaped magnetic shielding, and configured for measuring a magnetic field component oriented in the second direction;
wherein the metal plate or metal layer is arranged outside of the U-shaped magnetic shielding,
wherein the metal plate or metal layer is a portion of said metal housing with said cavity in the vicinity of the magnetic sensor, and at least one of the following features:
i) wherein the metal plate or metal layer has a length larger than 90% of a length of the shielding measured in the first direction;
ii) wherein the metal plate or metal layer has a width larger than 90% of a distance between inner sides of the shielding leg portions.

* * * * *